(12) United States Patent
Shindo et al.

(10) Patent No.: US 7,808,139 B2
(45) Date of Patent: Oct. 5, 2010

(54) MAGNETIC DISK DRIVE WITH IMPROVED VIBRATION CHARACTERISTICS

(75) Inventors: Hitoshi Shindo, Kanagawa (JP); Marutomo Goto, Kanagawa (JP); Takashi Kouno, Ibaraki (JP)

(73) Assignee: Hitachi Global Storage Technologies, Inc. Netherlands B.V., Amsterdam (NL)

( * ) Notice: Subject to any disclaimer, the term of this patent is extended or adjusted under 35 U.S.C. 154(b) by 233 days.

(21) Appl. No.: 11/355,415

(22) Filed: Feb. 15, 2006

(65) Prior Publication Data
US 2006/0181169 A1    Aug. 17, 2006

(30) Foreign Application Priority Data
Feb. 17, 2005    (JP)    ............... 2005-040793

(51) Int. Cl.
*H02K 7/08*    (2006.01)
*H02K 5/16*    (2006.01)

(52) U.S. Cl. .............. 310/90; 310/90.5; 360/98.07; 360/99.07; 384/107; 384/112

(58) Field of Classification Search .......... 310/90, 310/90.5; 360/98.07, 99.07; 384/107, 112; *H02K 7/08, H02K 5/16*
See application file for complete search history.

(56) References Cited

U.S. PATENT DOCUMENTS

| | | | | |
|---|---|---|---|---|
| 3,399,001 | A * | 8/1968 | Whitaker | 384/103 |
| 5,559,382 | A * | 9/1996 | Oku et al. | 310/90 |
| 5,855,437 | A * | 1/1999 | Lee | 384/110 |
| 6,127,756 | A * | 10/2000 | Iwaki et al. | 310/90 |
| 6,247,848 | B1 * | 6/2001 | Iwaki et al. | 384/107 |
| 6,316,856 | B1 * | 11/2001 | Kusaki et al. | 310/90 |
| 6,456,458 | B1 * | 9/2002 | Ichiyama | 360/99.08 |
| 6,502,992 | B2 * | 1/2003 | Nakazeki et al. | 384/110 |
| 6,781,268 | B2 | 8/2004 | Oku | |
| 7,042,125 | B2 * | 5/2006 | LeBlanc et al. | 310/90 |
| 7,459,416 | B2 * | 12/2008 | Hirata et al. | 508/485 |
| 2002/0067089 | A1 * | 6/2002 | Ichiyama | 310/90 |
| 2002/0195894 | A1 * | 12/2002 | Tokunaga | 310/90 |
| 2003/0020346 | A1 * | 1/2003 | Ichiyama | 310/90 |
| 2003/0174915 | A1 * | 9/2003 | Parsoneault et al. | 384/110 |
| 2003/0234589 | A1 * | 12/2003 | Parsoneault et al. | 310/90 |
| 2004/0000825 | A1 * | 1/2004 | Hirose et al. | 310/90 |
| 2004/0113501 | A1 * | 6/2004 | Tokunaga et al. | 310/90 |

FOREIGN PATENT DOCUMENTS

| | | |
|---|---|---|
| JP | 2001-056023 | 2/2001 |
| JP | 2001-339899 | 12/2001 |
| JP | 2004-088816 | 3/2004 |
| JP | 2004-245282 | 9/2004 |
| JP | 2004-270820 | 9/2004 |

* cited by examiner

*Primary Examiner*—Quyen Leung
*Assistant Examiner*—John K Kim
(74) *Attorney, Agent, or Firm*—Rambod Nader; Townsend and Townsend and Crew

(57) ABSTRACT

Embodiments of the invention provide a magnetic disk drive having improved vibration characteristics and a reduced size. In one embodiment, a magnetic disk drive comprises: a motor shaft for rotating a magnetic disk; a sleeve for rotatably supporting the motor shaft; and a motor hub into which the motor shaft is press fit. The motor hub supports the magnetic disk and includes a projection portion having an inner surface and an outer surface. The inner surface is in contact with the press-fit motor shaft in directions perpendicular to the rotational axis of the motor shaft. The outer surface faces the sleeve.

12 Claims, 11 Drawing Sheets

Fig. 1 1 (PRIOR ART)
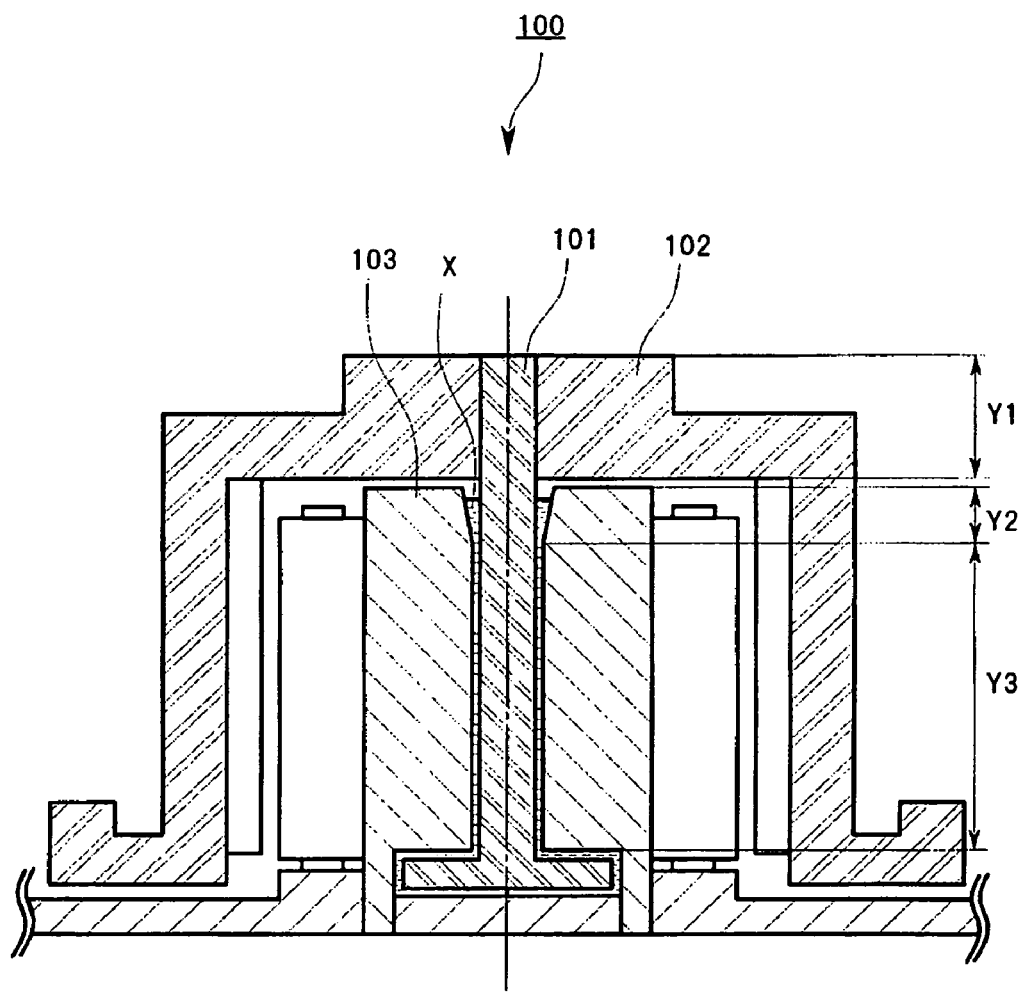

MAGNETIC DISK DRIVE WITH IMPROVED VIBRATION CHARACTERISTICS

CROSS-REFERENCES TO RELATED APPLICATIONS

This application claims priority from Japanese Patent Application No. JP2005-040793, filed Feb. 17, 2005, the entire disclosure of which is incorporated herein by reference.

BACKGROUND OF THE INVENTION

The present invention relates to a magnetic disk drive, and more particularly to a technique of improving the vibration characteristics of a magnetic disk drive and reducing its size.

In recent years, there has been a need to miniaturize magnetic disk drives such as hard disk drives. Some such magnetic disk drives employ a cantilever type spindle motor and a fluid bearing as shown in FIG. 11.

The magnetic disk drive 100 includes: a motor shaft 101 for rotating a magnetic disk (not shown); a motor hub 102 into which the motor shaft 101 is press fit and which supports the magnetic disk; and a sleeve 103 for rotatably supporting the motor shaft 101 through oil X.

Since such a cantilever type magnetic disk drive 100 is susceptible to external vibrations, etc., the stiffness of the radial bearing has been increased to improve the vibration characteristics. See, e.g., Patent Document 1 (Japanese Patent Laid-open No. 2001-339899).

BRIEF SUMMARY OF THE INVENTION

The above conventional magnetic disk drive 100 must have a thickness large enough to accommodate the following lengths: the length Y1 of the portion of the motor shaft 101 press fit into the motor hub 103; the length Y2 of the oil buffer for holding the excess portion of the oil X held between the motor shaft 101 and the sleeve 103; and the length Y3 of the radial bearing portion of the sleeve 103 for supporting the motor shaft 101.

Therefore, there is a limit to the miniaturization of the above conventional magnetic disk drive 100; it is difficult to reduce the thickness of the drive.

The present invention has been devised in view of the above problems. It is, therefore, a feature of the present invention to provide a magnetic disk drive having improved vibration characteristics and a reduced size.

To solve the above problems, a magnetic disk drive according to an embodiment of the present invention comprises: a motor shaft for rotating a magnetic disk; a sleeve for rotatably supporting the motor shaft; and a motor hub into which the motor shaft is press fit, the motor hub supporting the magnetic disk and including a projection portion having an inner surface and an outer surface, the inner surface being in contact with the press-fit motor shaft in directions perpendicular to the rotational axis of the motor shaft, the outer surface facing the sleeve.

BRIEF DESCRIPTION OF THE DRAWINGS

FIG. 11 is a cross-sectional view of a conventional magnetic disk drive.

DETAILED DESCRIPTION OF THE INVENTION

Figure 1:
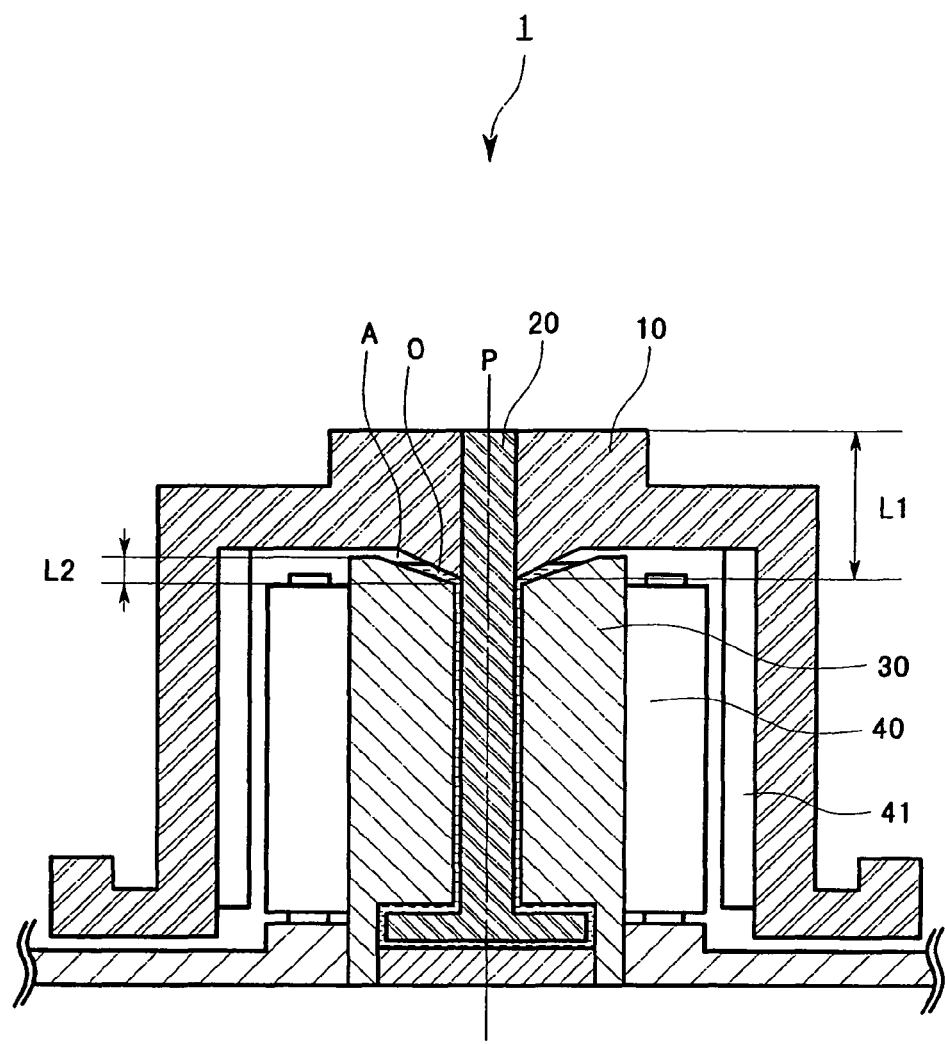
FIG. 1 is a cross-sectional view of a first example of a magnetic disk drive according to an embodiment of the present invention, taken along the rotational axis P.

A description will be given below of a magnetic disk drive according to an embodiment of the present invention with reference to the accompanying drawings. FIG. 1 is a cross-sectional view of a first example of the magnetic disk drive (hereinafter referred to as disk drive 1) of the present embodiment.

As shown in FIG. 1, the disk drive 1 includes: a motor hub 10 for supporting a magnetic disk (not shown); a motor shaft 20 press fit into the motor hub 10; and a sleeve 30 for rotatably supporting the press-fit motor shaft 20 through oil O.

Further, the disk drive 1 also includes a coil stator 40 and a magnet 41 which are disposed between the motor hub 10 and the sleeve 30 to generate a magnetic field for rotating the motor shaft 20.

A characteristic of the disk drive 1 is that the motor hub 10 and the sleeve 30 are disposed such that the upper portion of the motor hub 10 and the sleeve 30 partially overlap each other in the direction of the rotational axis P of the motor shaft 20. At least a portion of the length L2 of the oil buffer A overlaps the length L1 of the portion of the motor shaft 20 press fit into the motor hub 10.

That is, the oil buffer A of the sleeve 30 is formed such that its upper surface is higher than the lowest point of the portion or hole of the motor hub 10 into which the motor shaft 20 is press fit. That portion of the motor hub 10 downwardly extends inside the oil buffer A in the direction of the rotational axis P of the motor shaft 20.

Figure 2:
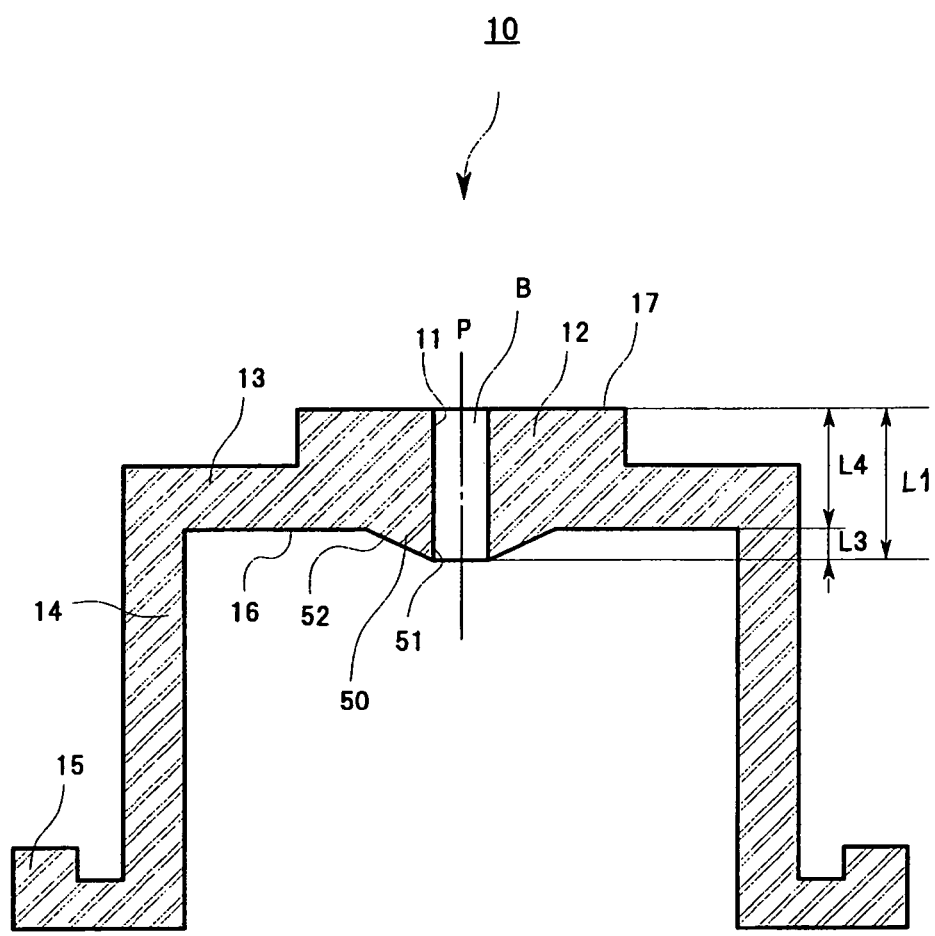
FIG. 2 is a cross-sectional view of the motor hub of the first example according to the embodiment, taken along the rotational axis P.

FIG. 2 is a cross-sectional view of the motor hub 10 of the disk drive 1. As shown in the figure, the motor hub 10 includes: a central portion 12 including the inner surface 11 of the hole B into which the motor shaft 20 is press fit; a top plate portion 13 having a disk shape and extending from the central portion 12 in directions approximately perpendicular to the rotational axis P; a side plate portion 14 downwardly extending from the outer circumference of the top plate portion 13; and a disk-receiving portion 15 extending from the lower end of the side plate portion 14 in directions approximately perpendicular to the rotational axis P and supporting the magnetic disk (not shown).

Further, the central portion 12 includes a projection portion 50 provided on its back surface side, that is, the side facing the sleeve 30. The projection portion 50 downwardly extends from the back surface 16 of the top plate portion 13.

The projection portion 50 has: a projection portion inner surface 51 in contact with the motor shaft 20 press fit into the hole B for press fitting in directions perpendicular to the rotational axis P; and a projection portion outer surface 52 facing a portion, described later, of the sleeve 30.

The projection portion inner surface 51 constitutes a portion of the inner surface 11 of the hole B for press fitting opened at the center of the projection portion 50. Further, the projection portion outer surface 52 is formed at an angle with the rotational axis P.

The length from the back surface 16 of the top plate portion 13 to the lowest point of the projection portion 50, that is, the length L3 of the projection portion 50, is approximately equal to the length L2 of the oil buffer A. In the disk drive 1, a portion of the length L2 of the oil buffer A overlaps the length L3 of the projection portion 50, as shown in FIG. 1.

The length of the inner surface 11 of the hole B for press fitting is equal to the length L1 of the portion of the motor shaft 20 press fit into the motor hub 10 and is the sum of the length L4 from the central portion upper surface 17 to the top plate portion back surface 16 and the length L3 of the projection portion 50.

Figure 3:
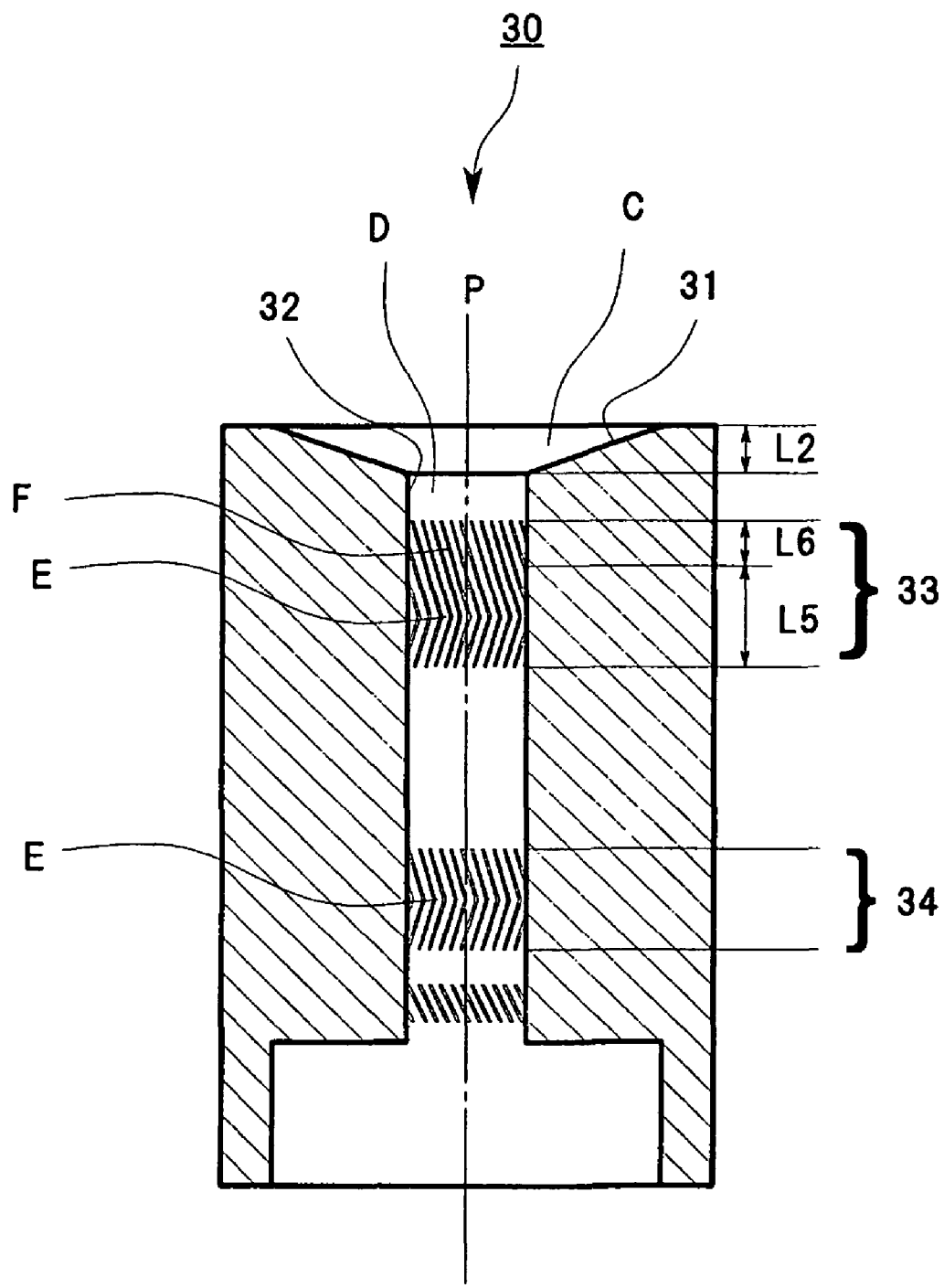
FIG. 3 is a cross-sectional view of the sleeve of the first example according to the embodiment, taken along the rotational axis P.

FIG. 3 is a cross-sectional view of the sleeve 30 of the disk drive 1. As shown in the figure, the sleeve 30 has: a buffer inner surface 31 facing approximately parallel to the projection portion outer surface 52; and a bearing inner surface 32 for rotatably supporting the motor shaft 20 through the oil O.

Naturally, the dimension of the buffer inner surface 31 in the direction of the rotational axis P is equal to the length L2 of the oil buffer A. Further, in the disk drive 1, as shown in FIG. 1, the buffer inner surface 31 forms a hole C for receiving therein the projection portion 50 having the length L3. That is, the disk drive 1 is configured such that the outer surface 52 of the projection portion 50 received within the projection-portion-receiving hole C and the buffer inner surface 31 facing the projection portion outer surface 52 form the oil buffer A therebetween.

Thus, the disk drive 1 includes: the projection portion inner surface 51 in contact with the motor shaft 20 press fit into the motor hub 10 in directions perpendicular to the rotational axis P; and the projection portion outer surface 52 and the buffer inner surface 31 facing each other and forming the oil buffer A therebetween.

Further, the bearing inner surface 32 is cylindrical and forms a bearing hole D into which the motor shaft 20 is inserted (see FIG. 1). In the disk drive 1, the oil O is held between the bearing inner surface 32 and the motor shaft 20 inserted into the bearing hole D, as shown in FIG. 1.

The bearing inner surface 32 includes a plurality of radial bearing regions 33, 34 having grooves formed therein to generate dynamic pressure by the action of the oil O so as to rotatably support the motor shaft 20 and thereby function as a fluid bearing.

More specifically, the bearing inner surface 32 includes an upper radial bearing region 33 and a lower radial bearing region 34 spaced a predetermined distance apart along the direction of the rotational axis P.

In the lower portion having the length L5 of the upper radial bearing region 33, a plurality of balancing grooves E are formed to generate dynamic pressure by the action of the oil O. Further, in the upper portion having the length L6 above the balancing grooves E, a plurality of unbalancing grooves F are formed such that they follow the balancing grooves E to prevent the oil O from leaving the bearing hole D or the oil buffer A. It should be noted that unlike the upper radial bearing region 33, only balancing grooves E are formed in the lower radial bearing region 34.

Figure 4:
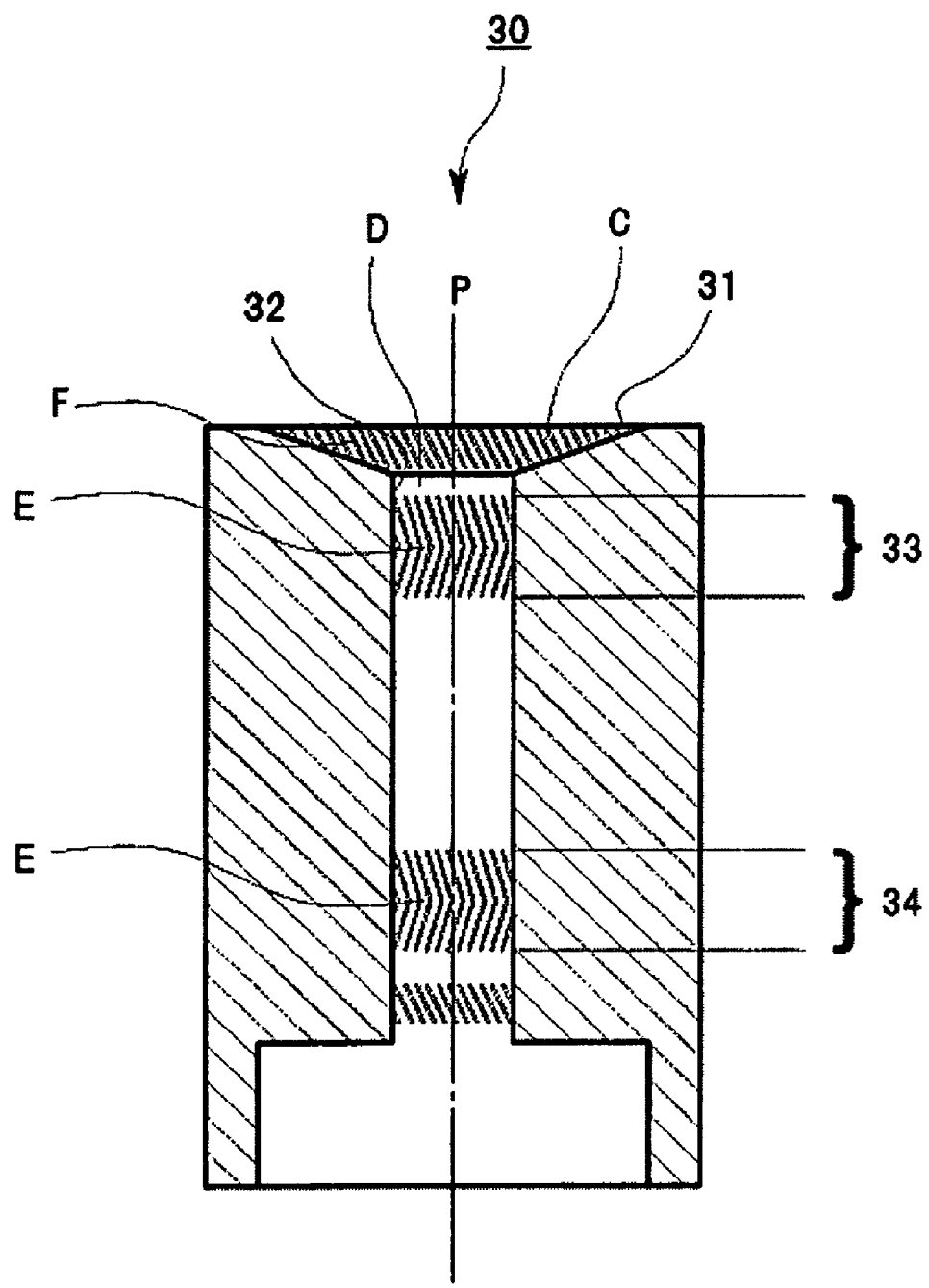
FIG. 4 is a cross-sectional view of the sleeve of the first example according to the embodiment, taken along the rotational axis P, wherein unbalancing grooves are formed in the buffer inner surface.

It should be further noted that unbalancing grooves F may be formed in the buffer inner surface 31 of the sleeve 30, as shown in FIG. 4. In this case, only the balancing grooves E need to be formed in the upper radial bearing region 33 of the bearing inner surface 32, allowing the sleeve 30 to have the upper radial bearing region 33 at a higher position than shown in FIG. 3. This makes it possible to more stably support the motor shaft 20.

Figure 5:
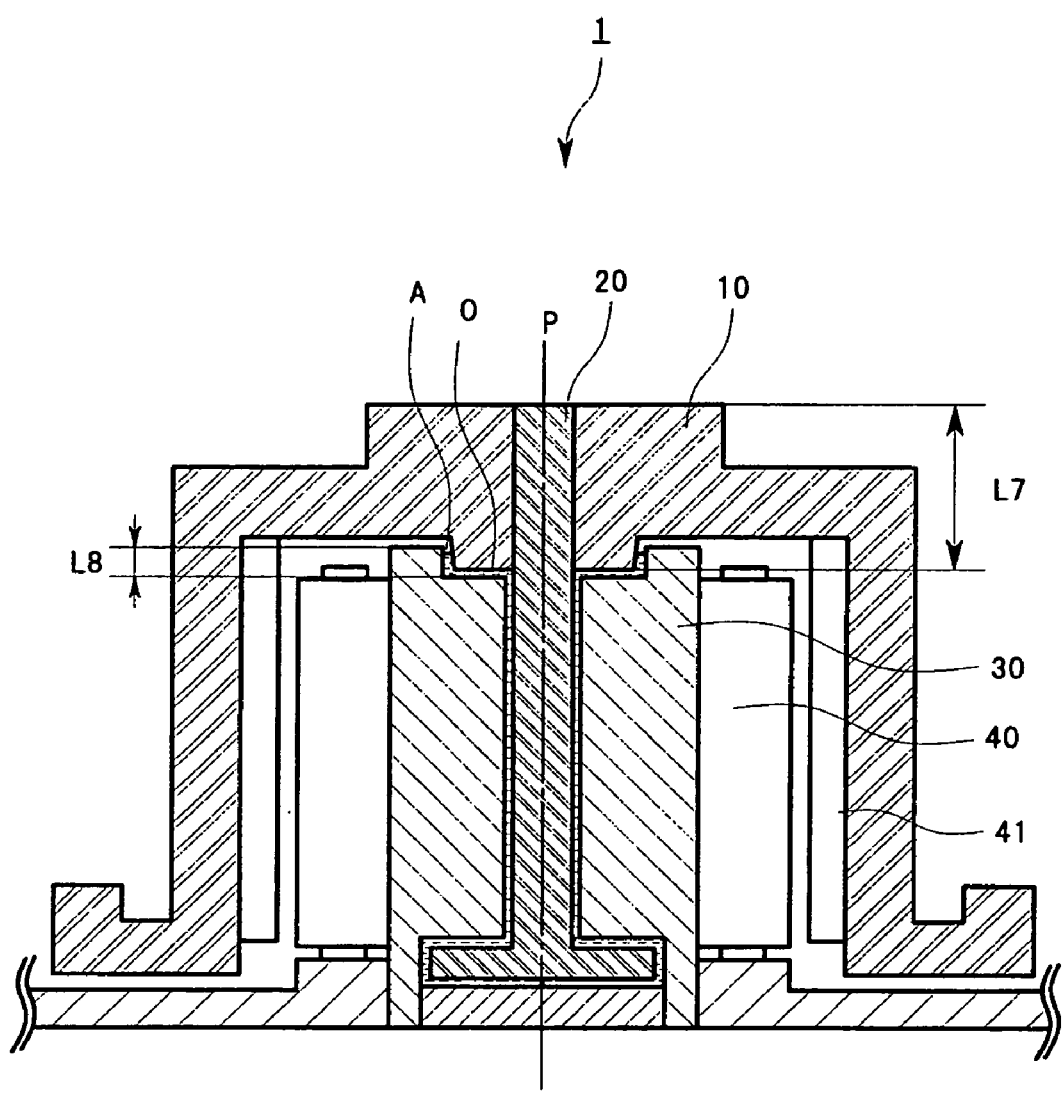
FIG. 5 is a cross-sectional view of a second example of the magnetic disk drive according to the embodiment, taken along the rotational axis P.
Figure 6:
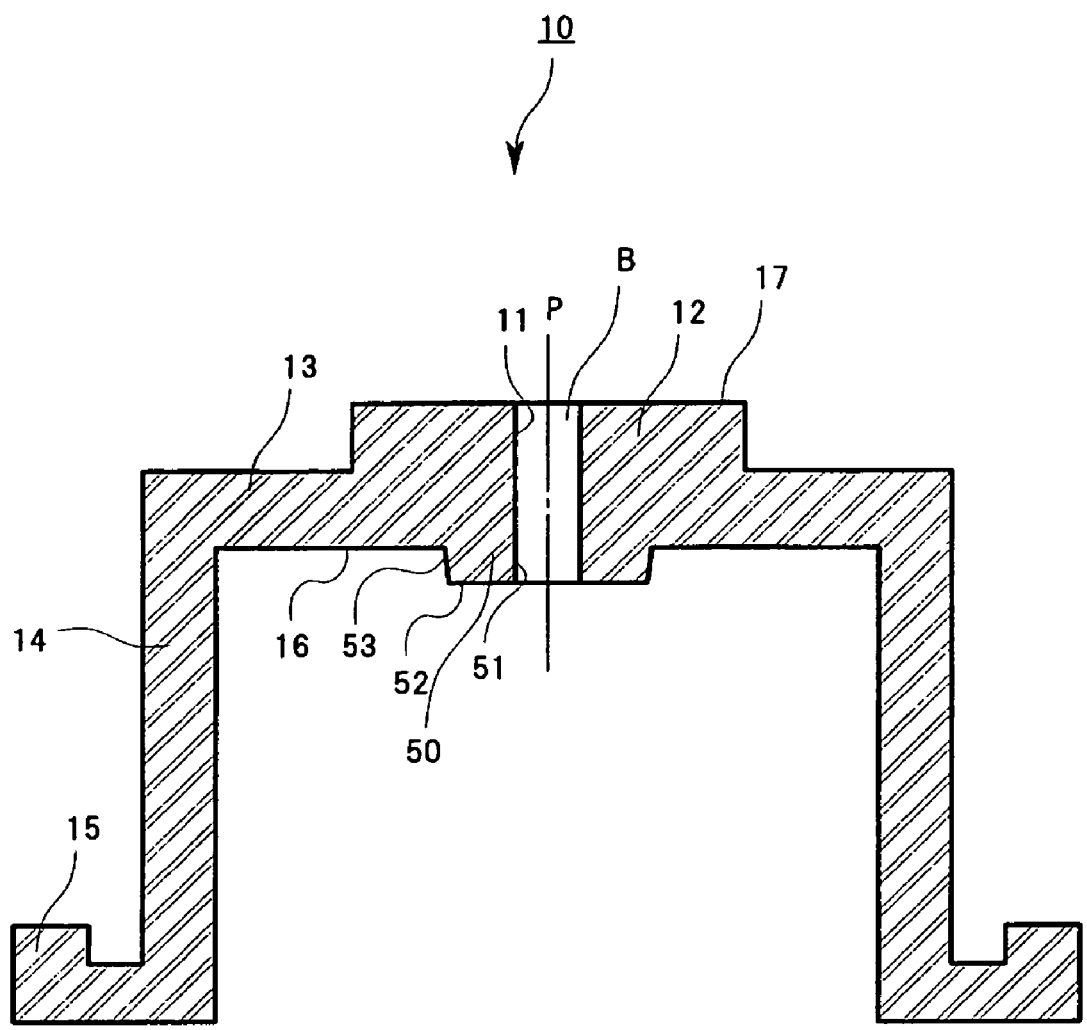
FIG. 6 is a cross-sectional view of the motor hub of the second example according to the embodiment, taken along the rotational axis P.
Figure 7:
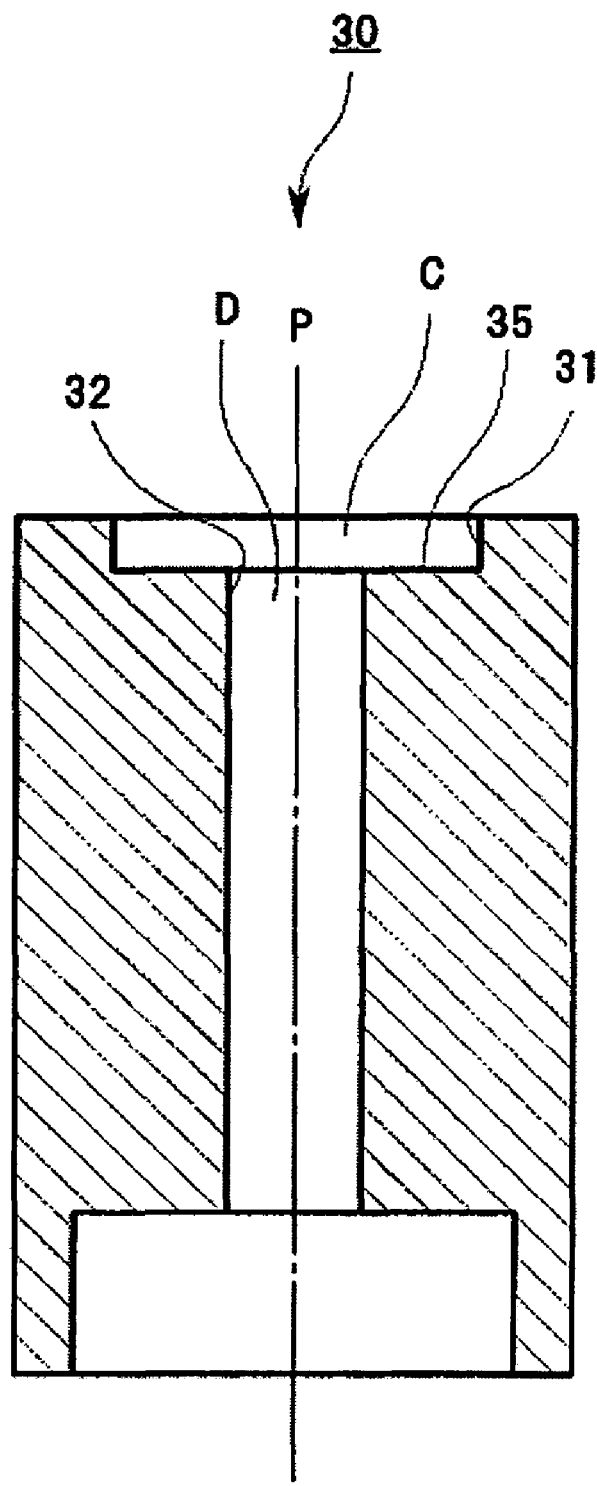
FIG. 7 is a cross-sectional view of the sleeve of the second example according to the embodiment, taken along the rotational axis P.

FIG. 5 is a cross-sectional view of a second example of the disk drive 1. FIGS. 6 and 7 are cross-sectional views of the motor hub 10 and the sleeve 30, respectively, of this example. It should be noted that the second example includes components of the first example. The detailed description of these components will not be repeated below.

In the second example, the motor hub 10 of the disk drive 1 includes a projection portion 50 having: a projection portion outer surface 52 approximately parallel to the rotational axis P; and a projection portion undersurface 53 approximately perpendicular to the rotational axis P and connecting between the projection portion outer surface 52 and the projection portion inner surface 51 (see FIGS. 5 and 6).

Further, the sleeve 30 of this disk drive 1 has: a buffer inner surface 31 approximately parallel to the projection portion outer surface 52 of the motor hub 10; and a buffer bottom surface 35 approximately parallel to the projection portion undersurface 53 (see FIGS. 5 and 7).

In this sleeve 30, the projection-portion-receiving hole C is formed by the buffer inner surface 31 and the buffer bottom surface 35.

In this disk drive 1, the buffer inner surface 31 and the buffer bottom surface 35 of the sleeve 30 face the outer surface 52 and the undersurface 53, respectively, of the projection portion 50 received within the projection-portion-receiving hole C; these surfaces form therebetween the oil buffer A for holding the oil O.

Also in the second example, the motor hub 10 and the sleeve 30 are disposed such that the upper portion of the motor hub 10 and the sleeve 30 partially overlap each other in the direction of the rotational axis P of the motor shaft 20. At least a portion of the length L8 of the oil buffer A overlaps the length L7 of the portion of the motor shaft 20 press fit into the motor hub 10. It should be noted that the sleeve 30 shown in FIG. 7 may have balancing grooves E and unbalancing grooves F as shown in FIGS. 3 and 4.

Figure 8:
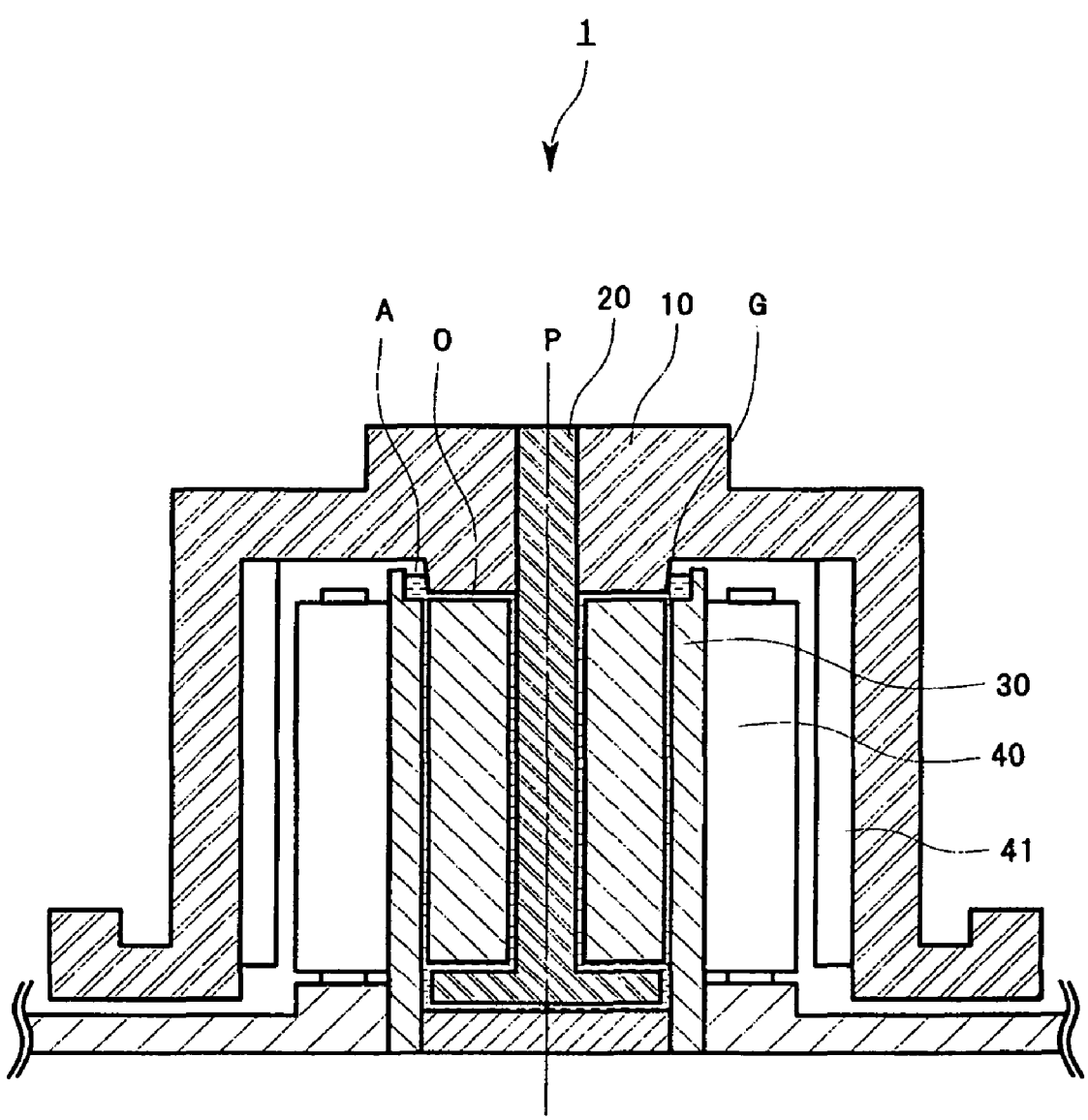
FIG. 8 is a cross-sectional view of the second example of the magnetic disk drive according to the embodiment, taken along the rotational axis P, wherein an oil circulation flow path is formed in the sleeve.

Further, in this disk drive 1, an oil circulation flow path G for circulating the oil O may be formed between the buffer inner surface 31 and the bearing inner surface 32 of the sleeve 30, as shown in FIG. 8.

Figure 9:
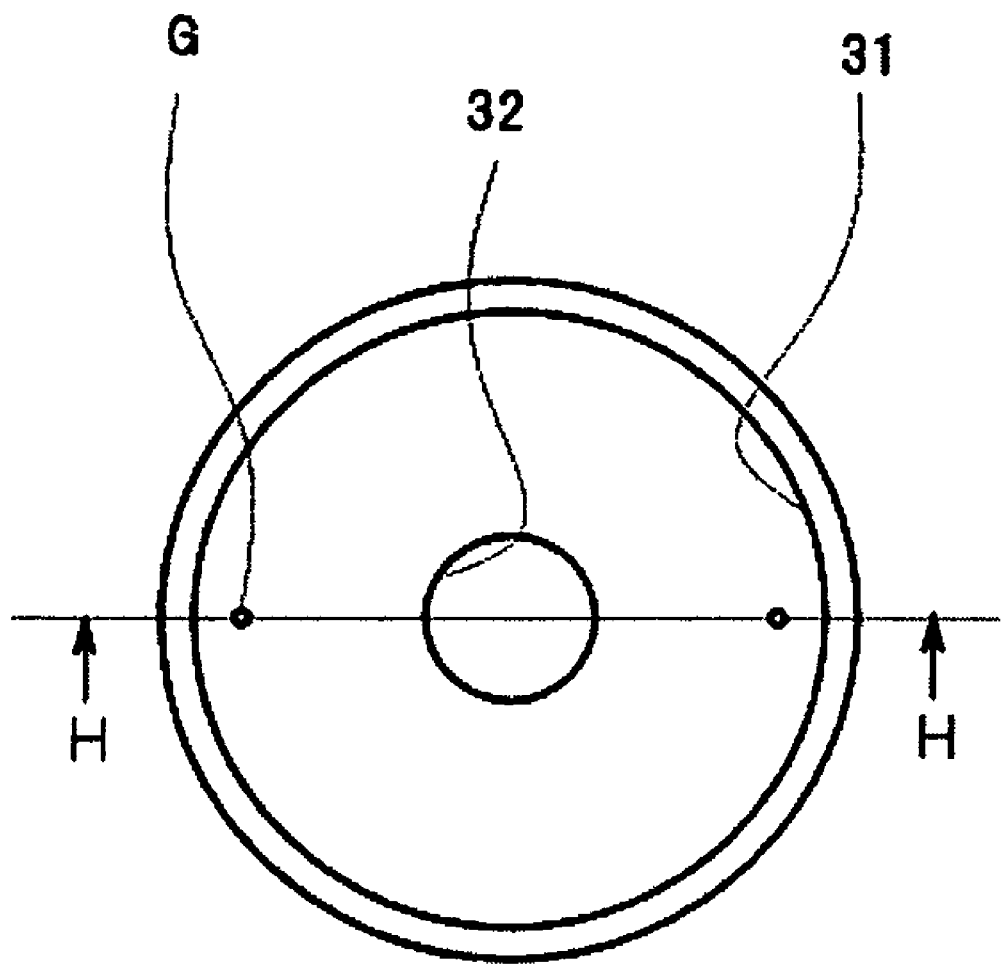
FIG. 9 is a plan view of the sleeve of the second example according to the embodiment, wherein the oil circulation flow path is formed in the sleeve.
Figure 10:
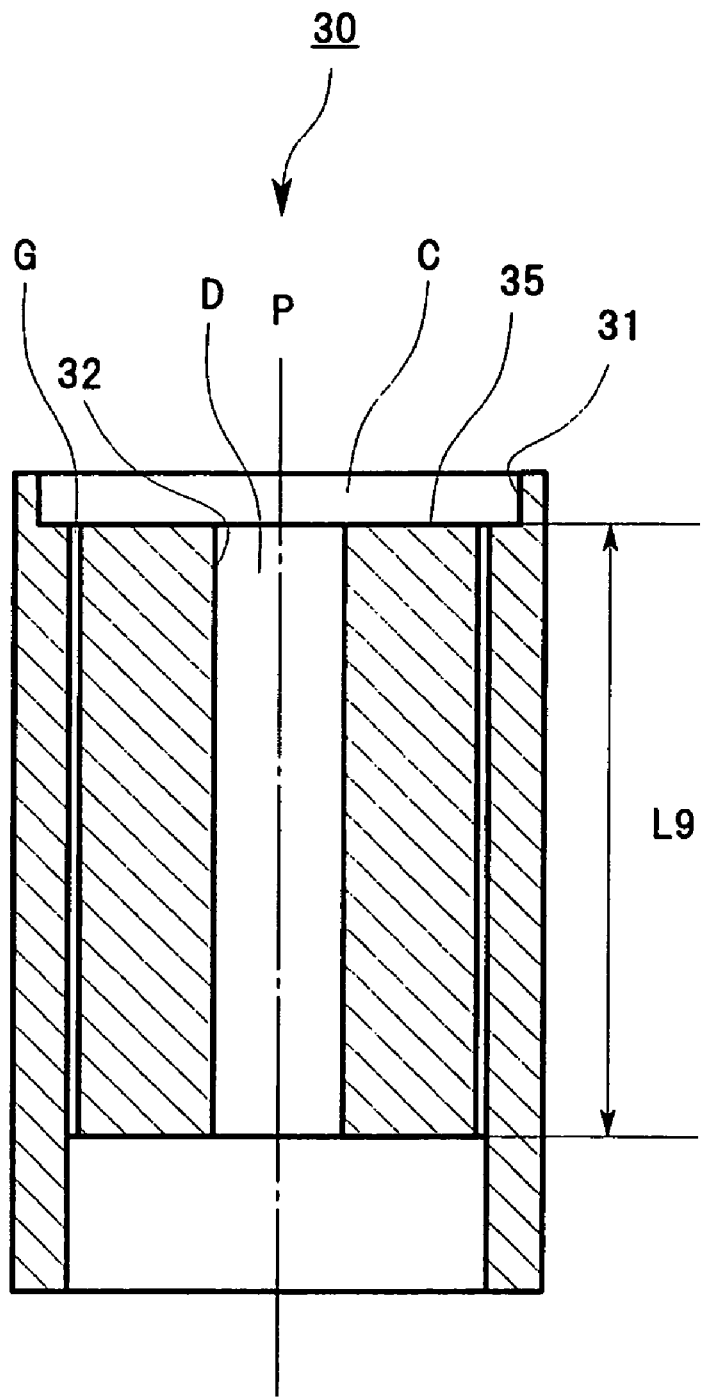
FIG. 10 is a cross-sectional view of the sleeve shown in FIG. 9 taken along line H-H.

FIG. 9 is a plan view of such a sleeve 30, and FIG. 10 is a cross-sectional view taken along line H-H in FIG. 9. In this sleeve 30, the oil circulation flow path G is formed between the buffer inner surface 31 and the bearing inner surface 32 such that the path is located at points on the circumference of a circle concentric with the buffer inner surface 31 and the bearing inner surface 32 centered at the rotational axis P, as shown in FIG. 9.

As shown in FIGS. 8 and 10, the oil circulation flow path G is made up of through holes running downward from the buffer bottom surface 35 along the length L9 of the bearing inner surface 32. The oil circulation flow path G also functions to allow fine bubbles generated between the motor shaft 20 and the sleeve 30 to escape, for example.

In this disk drive 1 configured as described above, a magnetic field is generated between the magnet 41 fixed to the side plate portion 14 of the motor hub 10 and the coil stator 40 fixed to the sleeve 30 so as to face the magnet 41, thereby integrally rotating the motor hub 10, the magnetic disk supported by the disk-receiving portion 15 of the motor hub 10, and the motor shaft 20 press fit into the motor hub 10.

It should be noted that as the motor shaft 20 rotates, the oil O held between the motor shaft 20 and the sleeve 30 is gathered through the balancing grooves E formed in the radial bearing regions 33 and 34 of the bearing inner surface 32, thereby generating dynamic pressure which allows the motor shaft 20 to float within the bearing hole D and rotate smoothly.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A magnetic disk drive comprising:
   a motor shaft for rotating a magnetic disk;
   a sleeve for rotatably supporting said motor shaft; and
   a motor hub into which said motor shaft is press fit, said motor hub supporting said magnetic disk and including a projection portion having an inner surface and a sloped outer surface, said inner surface being in contact with said press-fit motor shaft in directions perpendicular to the rotational axis of said motor shaft, said sloped outer surface extends downwardly in the direction of the motor shaft so that a lower edge of the sloped outer surface meets an edge of said inner surface at a lowest contact position with the motor shaft;
   wherein said sloped outer surface completely and directly faces, but does not contact, a sloped surface of said sleeve.

2. The magnetic disk drive as claimed in claim 1, wherein an oil is held between said outer surface of said projection portion and said sleeve.

3. The magnetic disk drive as claimed in claim 1, wherein a groove for preventing oil leakage is formed in an inner surface of said sleeve, said inner surface of said sleeve facing said outer surface of said projection portion.

4. The magnetic disk drive as claimed in claim 1, wherein said sleeve includes a bearing inner surface facing said motor shaft and including a plurality of radial bearing regions having grooves formed therein to generate dynamic pressure by the action of the an oil disposed between said bearing inner surface and said motor shaft so as to rotatably support the motor shaft.

5. The magnetic disk drive as claimed in claim 4, wherein said plurality of radial bearing regions include an upper radial bearing region and a lower radial bearing region spaced a predetermined distance apart along the direction of a rotational axis of said motor shaft.

6. The magnetic disk drive as claimed in claim 4, wherein said grooves are balancing grooves, and wherein said bearing inner surface further includes unbalancing grooves near ends of said bearing inner surface to prevent oil leakage from a space between said bearing inner surface of said sleeve and said motor shaft.

7. The magnetic disk drive as claimed in claim 1, wherein said outer surface of said projection portion is at a diagonal angle with respect to the rotational axis of said motor shaft.

8. The magnetic disk drive as claimed in claim 7, wherein said sleeve includes a buffer inner surface facing said outer surface of said projection portion and being at the diagonal angle with respect to the rotational axis of said motor shaft.

9. A magnetic disk drive comprising:
   a motor shaft for rotating a magnetic disk;
   a sleeve for rotatably supporting said motor shaft, said sleeve including a projection portion receiving hole having a buffer inner surface; and
   a motor hub into which said motor shaft is press fit, said motor hub supporting said magnetic disk and including a projection portion which is received by said projection portion receiving hole of said sleeve, the projection portion having an inner surface and a sloped outer surface, said inner surface being in contact with said press-fit motor shaft in directions perpendicular to the rotational axis of said motor shaft, said outer surface extends downwardly in the direction of the motor shaft so that a lower edge of the outer surface meets an edge of said inner surface at a lowest contact position with the motor shaft;
   wherein said sloped outer surface completely and directly faces said buffer inner surface and is spaced from said projection portion receiving hole of said sleeve.

10. The magnetic disk drive as claimed in claim 9, wherein a groove for preventing oil leakage is formed in an inner surface at said projection portion receiving hole of said sleeve, said inner surface of said sleeve facing said outer surface of said projection portion of said motor hub.

11. The magnetic disk drive as claimed in claim 9, wherein said outer surface of said projection portion is formed at a diagonal angle with respect to the rotational axis of said motor shaft.

12. The magnetic disk drive as claimed in claim 9, wherein the buffer inner surface facing said outer surface of said projection portion is formed at the diagonal angle with respect to the rotational axis of said motor shaft.

* * * * *